United States Patent [19]

Michaud et al.

[11] Patent Number: 4,648,372

[45] Date of Patent: Mar. 10, 1987

[54] FUEL PRE-HEATER

[76] Inventors: Jocelyn P. Michaud, 429 Sheraton Road, Burlington, Ontario, Canada, L7L 5M4; Leonard A. Brennan, 634 Blue Forest Hill, Burlington, Ontario, Canada, L7L 4H3

[21] Appl. No.: 726,552

[22] Filed: Apr. 23, 1985

[51] Int. Cl.$^4$ .................. F02M 31/10; F02G 5/00
[52] U.S. Cl. .................................. 123/557; 165/51
[58] Field of Search ............... 123/552, 557; 165/52, 165/51; 261/144, 145

[56] References Cited

U.S. PATENT DOCUMENTS

| 916,003 | 3/1909 | Osborn | 123/557 |
| 1,240,372 | 9/1917 | Rodgers | 165/52 |
| 1,248,954 | 12/1917 | Trotter | 165/52 |
| 1,273,363 | 7/1918 | Hale | 165/52 |
| 2,070,189 | 2/1937 | Webster | 165/52 |
| 3,378,063 | 4/1968 | Mefferd | 123/557 |
| 3,913,543 | 10/1975 | Richard | 123/557 |
| 4,044,742 | 8/1977 | Linder | 123/557 |
| 4,403,590 | 9/1983 | Davis | 123/557 |

Primary Examiner—Craig R. Feinberg
Assistant Examiner—David A. Okonsky
Attorney, Agent, or Firm—Arne I. Fors; Robert F. Delbridge

[57] ABSTRACT

A fuel pre-heater for internal combustion engines is disclosed. The heating of diesel fuel is desirable to improve efficiency of combustion, to reduce smoke emission, and to avoid precipitation of wax from the fuel which may plug filters. The pre-heater of the invention comprises an elongated housing divided into an inlet compartment, central heat exchange compartment, and outlet compartment. Heated coolant from an engine cooling system passes through thermoconductive tubes such as copper tubes in the central compartment to heat fluid fuel passing through the said central compartment. A normally-open thermostatically controlled value mounted in the outlet compartment and arranged in axial alignment with a coolant outlet closes when the coolant temperature reaches a predetermined level to maintain the fuel at a desired maximum temperature.

3 Claims, 5 Drawing Figures

FUEL PRE-HEATER

BACKGROUND OF THE INVENTION

This invention relates to a fuel pre-heater and, more particularly, relates to a fuel pre-heater for internal combustion engines.

The pre-heating of fuel, particularly diesel fuel, is well known. Diesel fuel typically contains paraffin wax which at low temperatures may solidify and precipitate out of the liquid fuel to plug fuel filters. Plugging of fuel filters and other obstructions to the free flow of fuel due to wax buildup causes starvation of fuel to the engine with resulting lack of engine power or stalling of the engine.

Warming of diesel fuel to about 120° F. will effectively redissolve wax crystals from fuel filters and fuel lines to improve fuel flow while generally improving efficiency of combustion with reduction of smoke emission.

U.S. Pat. No. 4,231,342 discloses a diesel fuel control valve system in which a temperature responsive fuel control valve is used to control the flow of surplus heated fuel to either the fuel tank for the engine or to return the surplus fuel directly to the injectors for the engine.

U.S Pat. Nos. 4,359,972 and 4,386,584 relate to a thermostatically controlled valve in an axial flow conduit for controlling the rate of flow of coolant to regulate the temperature of propane gas fed to an internal combustion engine.

U.S. Pat. No. 4,372,260 discloses another embodiment of engine fuel heater mounted in a fuel line which makes use of heated water received from the engine cooling system to heat the fuel as it passes through the heater body. This Patent discloses the alternative use of a submersible electric heat element for heating fuel before it passes through a fuel filter.

It is an object of the present invention to provide a novel heat exchanger which contains a thermostatically controlled valve for controlling the temperature of fuel heated by the heat exchanger.

It is another object of the present invention to provide a thermostatically controlled heat exchanger which permits the facile exchange of thermostat valves for servicing or for easy change of temperature level.

These and other objects of the invention will become apparent from the following detailed description.

SUMMARY OF THE INVENTION

The present invention is directed to a fuel pre-heater which controls the flow of heated engine coolant to permit heating of fuel to a desired temperature regardless of ambient temperature or the rate of fuel flow. In its broad aspect, the fuel pre-heater of the present invention comprises, in combination, an elongated closed housing having a coolant inlet at one end and a coolant outlet at the other end, a liquid-tight transverse partition disposed within said housing in proximity to each of said inlet and said outlet between said inlet and said outlet defining an inlet compartment, a central compartment and an outlet compartment, heat transfer elements formed of a thermoconductive material extending between said partitions through the central compartment and communicating the inlet compartment with the outlet compartment for the flow of heated coolant therethrough, a fuel inlet and a fuel outlet formed on the housing for the flow of fuel through the central compartment for heating of said fuel by the heat transfer elements, and normally-open thermostatically controlled valve means operatively positioned in said outlet chamber for closing the coolant outlet when the coolant reaches a predetermined temperature whereby the fuel is heated to a predetermined maximum temperature.

The heat transfer elements comprise a plurality of tubes formed of a thermoconductive material such as copper tubing extending through the central compartment between the transverse partitions. A pair of spaced-apart tubes extend substantially beyond the outlet partition and means are provided on said tubes to seat the valve means thereon. Preferably, a pair of opposed slots are formed in said pair of tubes for receiving a portion of said valve in sliding engagement such that said valve means are aligned with the coolant outlet and said coolant outlet includes a conduit threaded into said housing for axial adjustment into the outlet compartment relative to the valve means.

BRIEF DESCRIPTION OF THE DRAWINGS

The fuel heater of the present invention will now be described with reference to the following drawings, in which.

DESCRIPTION OF THE PREFERRED EMBODIMENT

Figure 1:
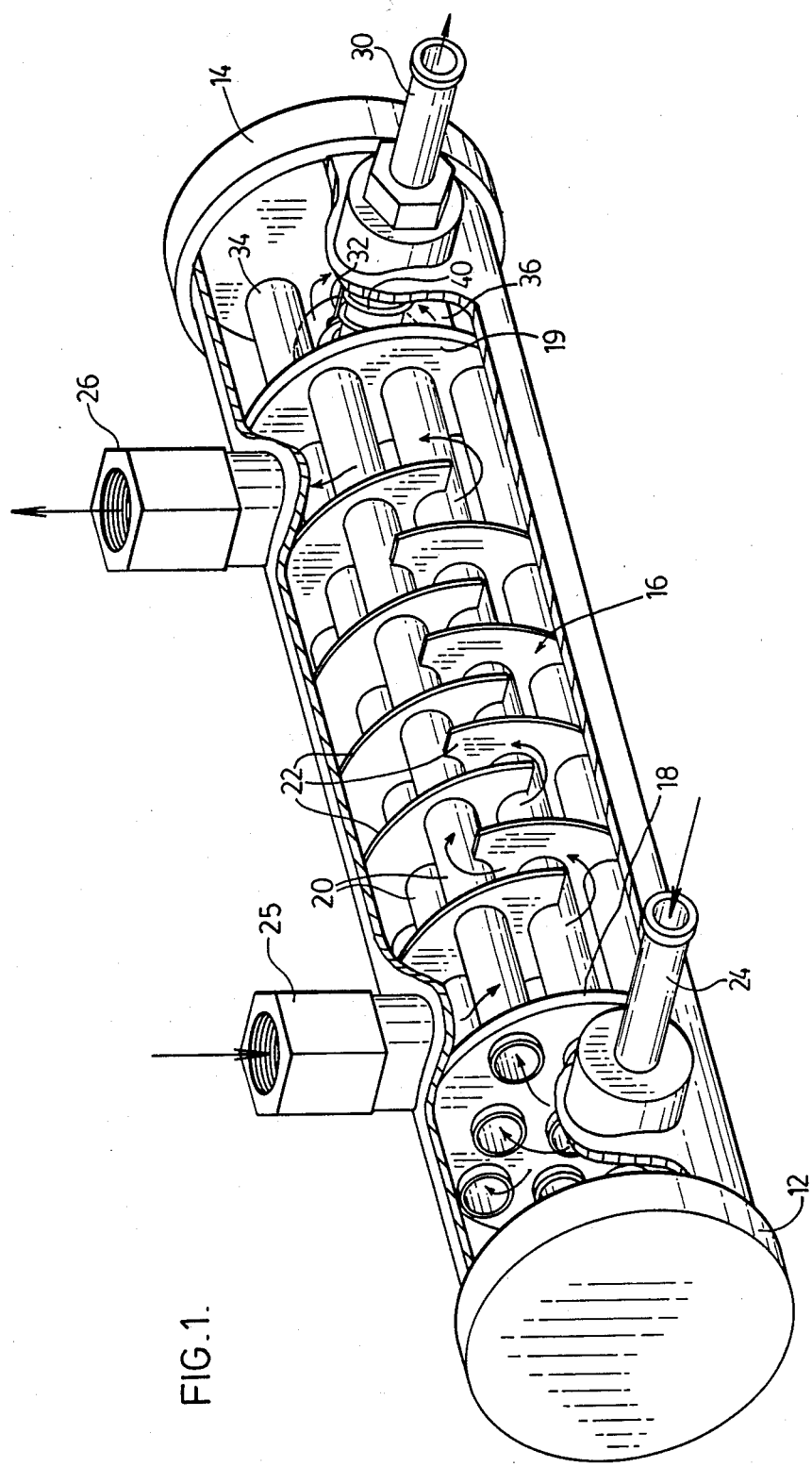
FIG. 1 is a perspective view, partly cut away, illustrating the flow of heated coolant and fuel.
Figure 2:
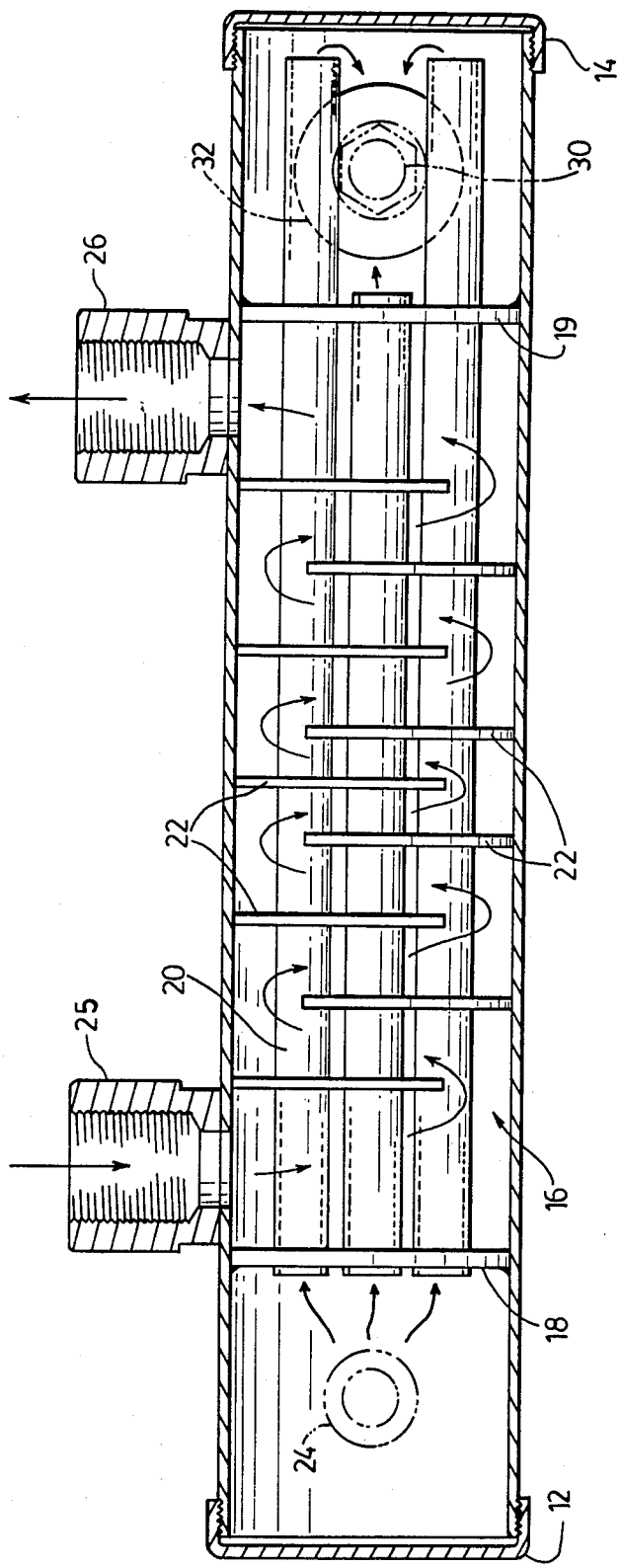
FIG. 2 is a longitudinal vertical section of the apparatus shown in FIG. 1.

With reference to FIGS. 1 and 2, the heat exchanger of the present invention comprises a cylindrical hollow housing 10 closed at both ends by caps 12,14 threaded onto said housing. A central compartment or chamber 16 is defined between a pair of spaced-apart transverse partitions 18,19 which are braised to the interior of housing 10 by bonding means such as silver solder.

A plurality of heat transfer elements formed of a thermoconductive material such as copper tubes 22 extend between partitions 18,19 to communicate inlet compartment 21 defined between cap 12 and partition 18 with outlet compartment 23 defined between partition 19 and cap 14. Coolant inlet 24 is secured to housing 10 to permit the ingress of coolant to inlet compartment 21 and outlet 30 is affixed to housing 10 to permit the egress of coolant from outlet compartment 23. Threaded fuel inlet 25 is affixed to housing 10 at one end of chamber 16 and threaded fuel outlet 26 is affixed to housing 10 at the opposite end of chamber 16 to permit the ingress of fluid to chamber 16, tortuous flow therethrough about baffles 22 and egress through outlet 26.

Figure 3:
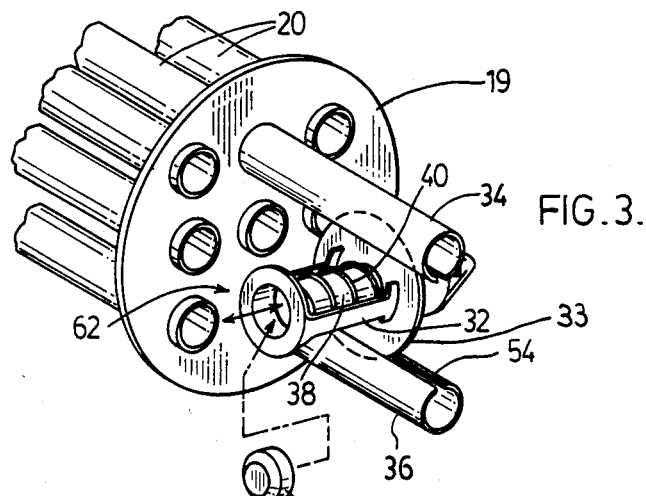
FIG. 3 is a perspective view of a thermostatically-controlled valve mounted on a pair of opposed heat exchange tubes.

Thermostatically controlled valve 62 is mounted on the extensions of tubes 34,36 by the sliding engagement of base flange 33 of the valve into opposed slots 54 formed in tubes 34,36. Valve 62 is slid onto tubes 34,36 for axial alignment of piston 38 which is adapted to reciprocate longitudinally in the directions shown by the arrows in FIG. 3 against the bias of compression spring 40, with tube 30.

Figure 4:
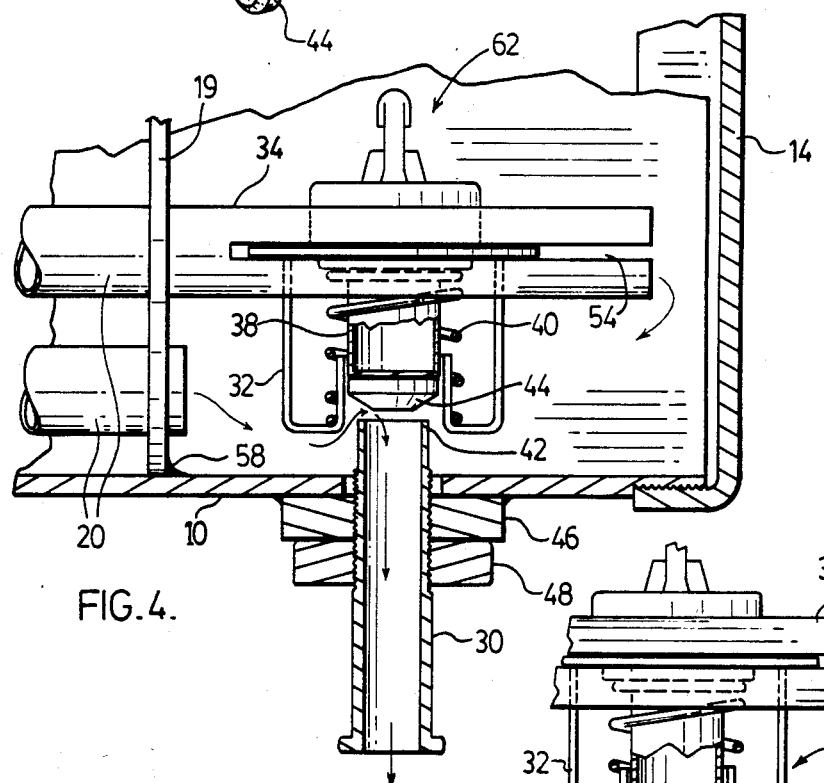
FIG. 4 is a side view of the thermostatically controlled valve in an open position.
Figure 5:
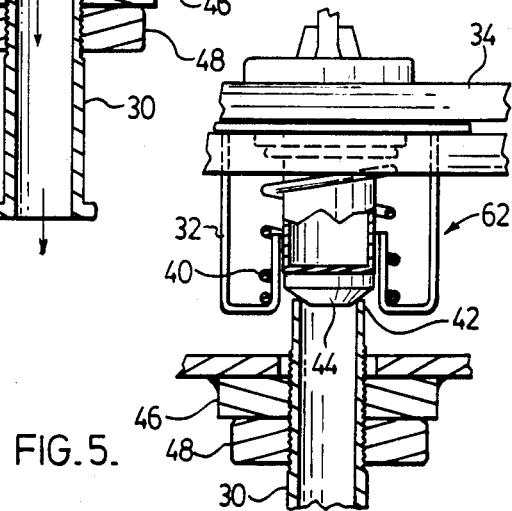
FIG. 5 is a view of the thermostatically controlled valve showing FIG. 4 in a closed position.

With reference now to FIGS. 4 and 5, the thermostatically controlled valve is shown in its normally open at-rest position with the flow of coolant through tubes 20 into outlet 30. As the temperature of the coolant increases, piston 38 is extended by the operation of the unit thermostat, as is well known in the art, to extend flexible washer 44 into abutment with the inner end 42 of outlet 30 to prevent the egress of coolant from outlet compartment 23.

In the operation of an internal combustion engine supplied with, for example, diesel fuel, the engine coolant is supplied to heat exchanger 10 at a temperature in the range of 160°-230° F. It may be desirable to supply the diesel fuel at a temperature of about 120° F., substantially below the operating temperature of the coolant. Valve 62 normally is open to the flow of coolant until the coolant temperature reaches a predetermined level at which time piston 38 is extended to close outlet 30, permitting the fuel passing through central compartment 16 to be heated to about the temperature of the coolant passing through tubes 20. Exchange of heat from the coolant to the fuel, together with loss of heat to the atmosphere, particularly during the winter months, results in a drop in the coolant temperature with a resulting retraction of piston 38 and opening of outlet 30. The flow of heated coolant is resumed until the coolant reaches the predetermined temperature level at which time the outlet is again closed to prevent an increase in coolant temperature. Outlet tube 30 can be axially adjusted into outlet compartment 23 to provide an accurate adjustment of temperature control by determining the degree of extension of piston 38 for abutment of washer 44 against the inner end 42 of outlet 30.

The coolant inlet and outlet preferably are affixed to housing 10 by the braising of collars 46, shown in FIG. 5, with the use of silver solder. Outlet 30 is locked in its axially adjusted position by means of a lock nut 48 to prevent loosening of outlet 30 due to vibration.

The present invention provides a number of important advantages. The heat exchanger can be readily incorporated in the fuel line and coolant system of a motor vehicle to provide improved cold weather operation, particularly for diesel-powered engines. A conventional thermostatically controlled valve is used in the unit permitting easy maintenance and replacement. Temperature control of the fuel can be attained by the simple expedient of axially adjusting the coolant outlet relative to the thermostatically controlled valve seated within the exchanger.

It will be understood that modifications can be made in the embodiment of the apparatus of the invention illustrated and described herein without departing from the scope and purview of the invention as defined by the appended claims.

What we claim as new and desire to protect by Letters Patent of the United States is:

1. A fuel preheater for a fluid fuel for use in an internal combustion engine having a liquid coolant system comprising, in combination:

an elongated closed housing having a coolant inlet at one end and a coolant outlet at the other end;

a liquid-tight transverse partition disposed within said housing in proximity to each of said inlet and said outlet between said inlet and said outlet defining an inlet compartment, a central compartment and an outlet compartment;

heat transfer elements comprised of a plurality of spaced-apart tubes formed of a thermoconductive material extending between said partitions through the central compartment and communicating the inlet compartment with the outlet compartment for the flow of heated coolant therethrough, a pair of said spaced-apart tubes extending into the outlet compartment;

a fuel inlet and a fuel outlet formed on the housing for the flow of fuel through the central compartment for heating of said fuel by the heat transfer elements; and normally-open thermostatically-controlled valve means operatively positioned in said outlet chamber are seated on means provided on said pair of spaced-apart tubes for closing the coolant outlet when the coolant reaches a predetermined temperature whereby the fuel is heated to a predetermined maximum temperature.

2. A fuel preheater as claimed in claim 1 in which said means to seat the valve comprise a pair of opposed slots formed in said pair of tubes for receiving a portion of said valve in sliding engagement.

3. A fuel preheater as claimed in claim 2 in which said valve means are aligned with the coolant outlet and said coolant outlet includes a conduit threaded into said housing for axial adjustment into the outlet compartment relative to the valve means to permit adjustment of the temperature at which the coolant outlet is closed.

* * * * *